March 9, 1965 G. F. BROWN ETAL 3,172,420
LIQUID FLOW CONTROL SYSTEM AND BY-PASS VALVE
Filed May 18, 1961 3 Sheets-Sheet 1

INVENTORS
JAMES K. MOSHER
GORDON F. BROWN
BY
Attorney

March 9, 1965 G. F. BROWN ETAL 3,172,420
LIQUID FLOW CONTROL SYSTEM AND BY-PASS VALVE
Filed May 18, 1961 3 Sheets-Sheet 2

INVENTORS
JAMES K. MOSHER
GORDON F. BROWN

BY

Attorney

March 9, 1965  G. F. BROWN ETAL  3,172,420
LIQUID FLOW CONTROL SYSTEM AND BY-PASS VALVE
Filed May 18, 1961  3 Sheets-Sheet 3
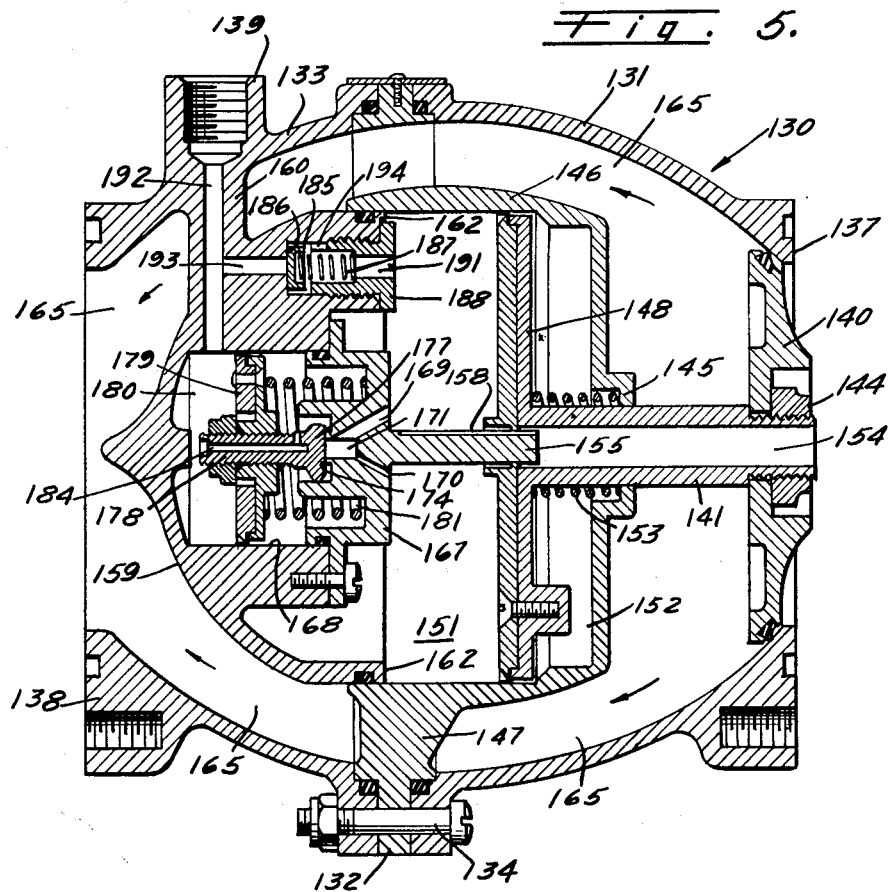
Gordon F. Brown,
James K. Mosher,
INVENTORS.
WHANN & McMANIGAL
Attorneys for Applicants United States Patent Office  3,172,420
Patented Mar. 9, 1965

3,172,420
LIQUID FLOW CONTROL SYSTEM AND
BY-PASS VALVE
Gordon F. Brown, Glendale, and James K. Mosher, Pasadena, Calif., assignors to Schulz Tool and Manufacturing Co., San Gabriel, Calif., a corporation of California
Filed May 18, 1961, Ser. No. 112,490
2 Claims. (Cl. 137—219)

This invention relates to a liquid flow control system and by-pass valve for use primarily in conduit arrangements incorporated with multiple liquid containers or compartments.

This application is a continuation-in-part of our co-pending application entitled "Liquid Flow Control System," Serial No. 573,203, filed March 22, 1956, now abandoned.

In systems wherein the control of the flow of liquid between compartments is desirable, such as, for example, in aircraft fuel tank arrangements, the control of flow between such compartments is necessary and means must be provided whereby continued flow of fuel will be assured even in the event of failure of some components of the system. In order to maintain accurate gravitational centers and prevent drawing of fuel from one portion of an airplane, which would create longitudinal or lateral instability, it is the usual practice to provide a plurality of series or parallel connected cells or compartments in the aircraft wings or fuselage. Booster pumps are used in conjunction with each of the cells to effect delivery of the fuel therefrom. As fuel is drawn from the innermost or engine feed tank or cell, this tank and the adjacent tanks extending outwardly therefrom are each drained, with the outermost tanks being emptied first. Float level arrangements in each of the tanks assures this serial flow of liquid. In the event a booster pump in one of the tanks should fail or if the tank should be inadvertently emptied as by combat puncture thereof, automatic means must be provided to by-pass this faulty tank or pump in order to assure continued operation of the aircraft.

Accordingly, it is an object of the present invention to provide a liquid flow control system for use between serially arranged compartments having automatic means for by-passing one or more compartments in the event of failure of portions of the system.

It is another important object of the present invention to provide pressure operable liquid by-pass means in a liquid flow control system.

It is a further object of the present invention to provide a pressure differential responsive flow control valve having means responsive to a reduction in a signal pressure to effect opening of the valve.

A still further object of the present invention is to provide a flow control valve for use in a liquid system wherein pressure acting upon liquid upstream from the valve may be utilized to effect opening thereof, there being means provided, responsive to a signal pressure, for maintaining the valve in a closed position.

It is another object of the present invention to provide a pressure differential responsive flow control valve having a valve member which is biased to be in its normal non-operating position.

It is still another object of the present invention to provide a pressure differential responsive flow control valve having means responsive to a reduction in a signal pressure to effect opening of the valve, said valve being biased to be in a normally closed position.

It is a further object of the present invention to provide a pressure responsive flow control valve having means responsive to a reduction in a signal pressure to effect opening of the valve, said valve being biased to be open in its non-operating position.

It is a still further object of the present invention to provide a flow control valve for use in a fluid system wherein pressure acting upon fluid upstream from the valve may be utilized to effect the opening thereof, there being means provided, responsive to a signal pressure, for positively maintaining the valve in a closed position when the signal fluid pressure is greater than the reference pressure or the upstream pressure.

It is another object of the present invention to provide a normally open, pressure responsive flow control valve for use in a fluid system wherein pressure acting upon fluid upstream from the valve may be utilized to effect the opening thereof when it is in a closed operating position, there being means provided, responsive to a signal pressure, for positively maintaining the valve in a closed position when said signal fluid pressure is greater than the reference pressure or the pressure upstream from the valve.

Other and further important objects of the present invention will become apparent from the disclosures in the following detailed specification, appended claims, and accompanying drawings, wherein:

FIG. 5 is an enlarged sectional view of another embodiment of a flow control valve according to the invention; and FIG. 6 is a fragmentary sectional view of the valve shown in FIG. 5, illustrating the valve venting conduits.

Figure 1:
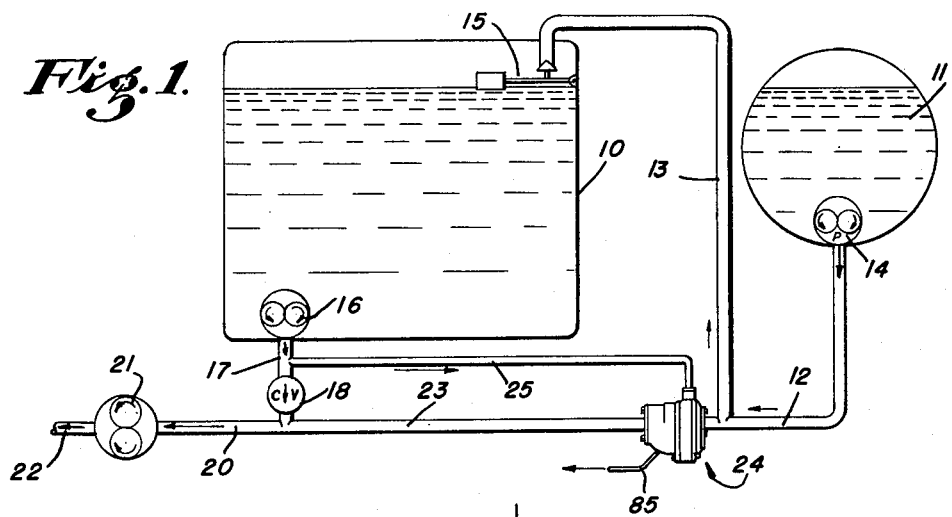
FIG. 1 is a diagrammatic view of the liquid flow system of the present invention incorporating the present control valve.

With reference to the drawings and with reference primarily to FIG. 1, a main compartment 10, which may be one of several serially arranged compartments, is adapted to receive liquid from a second compartment or liquid source 11 by way of a conduit 12 and a second conduit 13. A low pressure pump 14, arranged adjacent the source 11, effects delivery of liquid through the conduits 12 and 13 and to the tank 10. A liquid level responsive float valve 15, arranged in the upper portion of the tank 10, is adapted to terminate flow to the tank 10 upon establishment of a desired liquid level therein. A booster pump 16, arranged in the lower portion of the tank 10, is adapted for delivery of liquid from the tank through a conduit 17 past a check valve 18 and to a master conduit 20. The conduit 20 may be connected to an adjacent tank or may extend directly to a main liquid pump 21 and through a conduit 22 to a point of use such as, for example, an aircraft engine.

A by-pass conduit 23 communicates between the conduit 20 and one side of a liquid flow control valve, indicated generally at 24. The other side of the liquid flow control valve is operatively connected with the conduit 12 leading from the source tank 11. In the normal situation, the flow of liquid is adapted to be from the source compartment 11 through the conduits 12 and 13 into the tank 10 and from the tank 10 by way of conduits 17 and 20 to the pump 21, and to conduit 22 to a point of use. In the event of failure of the pump 16 or rupture of the walls of the tank 10, the path of liquid flow from the source tank 11 will be by way of the conduit 12 through the flow control valve 24 and conduits 23 and 20 to the pump 21, and conduit 22 to a point of use. The opening of the valve 24 is responsive to a drop in a signal pressure below a predetermined level, which for the purpose of the present invention, is shown as being sensed by way of a sensing line 25 extending between the flow control valve 24 and the conduit 17 intermediate the pump 16 and check valve 18.

Figure 2:
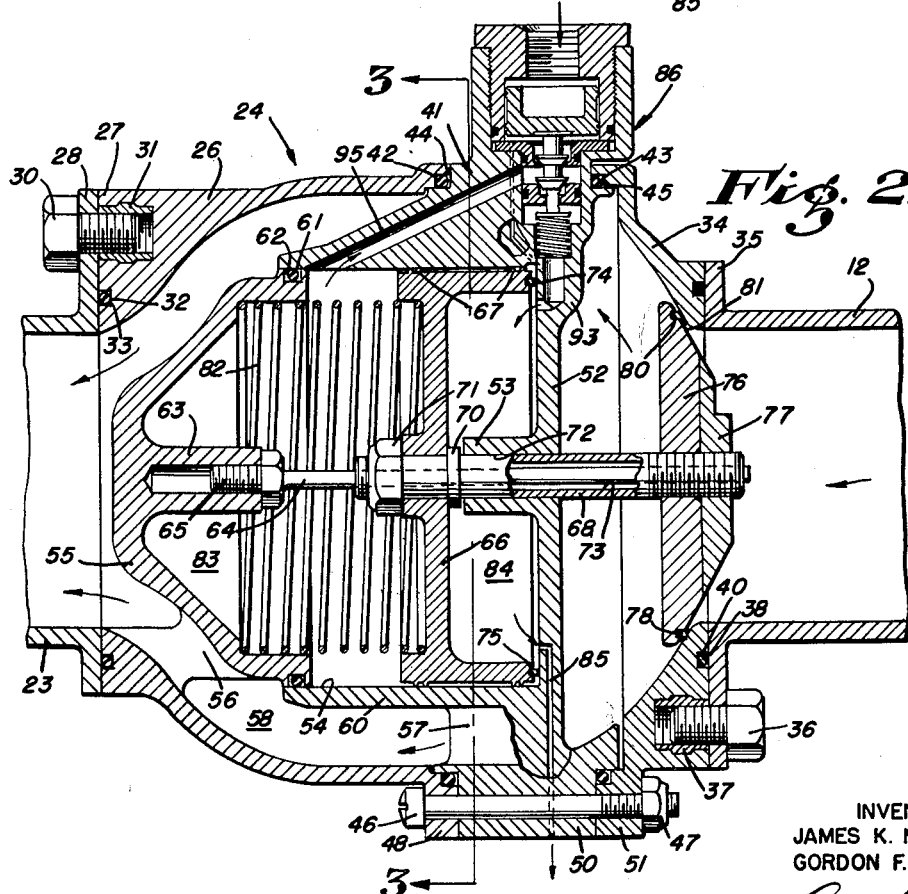
FIG. 2 is an enlarged sectional view of a flow control valve according to the invention.
Figure 3:
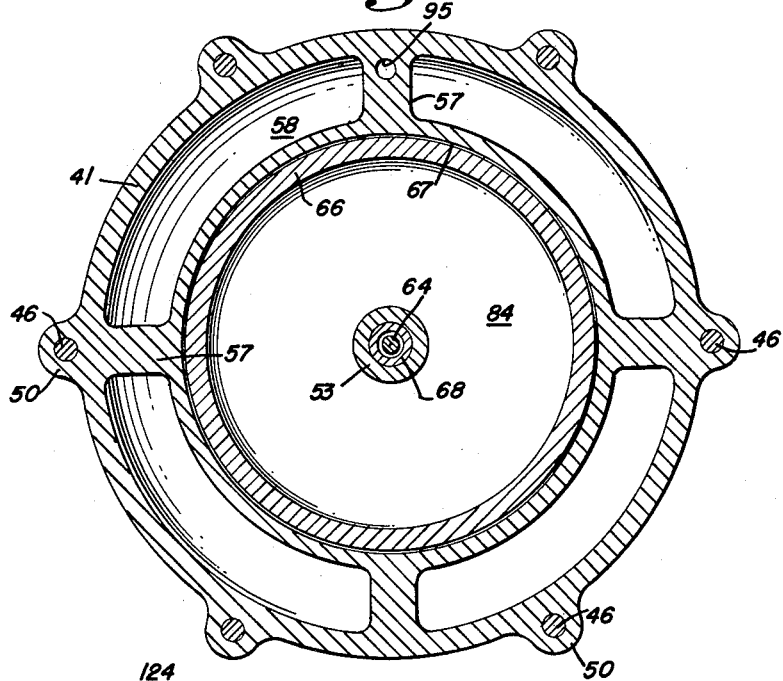
FIG. 3 is a transverse sectional view through the flow control valve as taken substantially as indicated by line 3—3 in FIG. 2.

With reference primarily to FIGS. 2 and 3 of the drawings, the flow control valve 24 includes an annular body 26 having an enlarged flanged portion 27 that is adapted for attachment to a flange 28 formed on the conduit 23. The flanges 27 and 28 are held in contact as by bolts 30, which are threadably received in inserts 31 in the body 26. A sealing ring 32 is disposed in a groove 33 in the body 26 and provides a liquid tight seal between flanges 27 and 28.

The end of valve 24, remote from the body portion 26, has a second annular body portion 34 that is secured to a flange 35 formed on the conduit 12, as by bolts 36 which are threadably received in inserts 37 in the body portion 34. An annular resilient ring 38 is positioned in the groove 40 and bears against the surfaces of the flange 35 to provide a liquid tight seal between the conduit 12 and the body portion 34.

The valve 24 further includes a central portion 41 positioned intermediate the body portions 26 and 34. A liquid tight seal is provided between the portion 41 and the portions 26 and 34, as by annular rings 42 and 43 disposed in peripheral grooves 44 and 45 in opposed ends of the portions 26 and 34. The rings 42 and 43 cooperate with outer annular surfaces of the central portion 41. The portion 41 is secured in contact with the portions 26 and 34, as by bolts 46 and nuts 47 arranged axially through flanges 48, 50 and 51 in the body portions 26, 41 and 34, respectively.

The central portion 41 has a transverse wall 52 which has a centrally disposed boss 53. The portion 41 is further provided with an enlarged, axially disposed bore 54. A closure and wall portion 55 is formed integrally with the body portion 26 and is adapted for reception and disposition in the open end of the bore 54. The wall 55 is supported in spaced relationship to the outer portion 26, as by webs 56, with the central portion 41 also being supported in spaced relationship with respect to the flange 50, as by webs 57. An annular flow passageway 58 is thus defined about the axial portion 60 of the central portion 41 and communicates with the conduits 12 and 23. The area of the passageway 58 is substantially equal to the area of the conduits 12 and 23, thus to eliminate as much pressure drop across the valve as possible. Additionally, the axial portion 60, together with the cover portion 55, is contoured in order to provide unrestricted flow through the passageway 58.

The end wall 55 is sealed with respect to the bore 54, as by an annular sealing ring 61 positioned in a peripheral groove 62 about the end wall 55. It may thus be seen that bore 54 has end closures on each end thereof, as defined by the transverse wall 54 and the wall 55. The central portion of the wall 55 has an axially disposed, inwardly directed boss 63. A guide member 64 is threadably disposed, as at 65 in the boss 63, and extends outwardly therefrom and into the flow passageway within the conduit 12 for a purpose to be hereinafter more fully described.

A piston 66 is disposed in the bore 54, with this piston having peripheral labyrinth sealing means 67 which coact with the wall of the bore 54. The piston 66 is attached to a valve support rod 68, as by a flange 70 formed on the rod, and a nut 71. The rod 68 is reciprocally positioned in a bore 72, formed axially through the wall 52 and boss 53. The rod 68 is further provided with an axial bore 73 therethrough through which the guide rod 64 is positioned, there being an annular space between the wall of the bore 73 and the guide rod 64. The piston 66 is further provided with a resilient cushion member 74 arranged in an axially facing groove 75 and adapted for cooperation with the bore 54 side of the transverse wall 52.

An annular valve member 76 is threadably secured on the outer end of the rod 68 and retained in position as by a lock nut 77. The valve member 76 has a peripheral, axially extending sealing member 78 positioned in a groove 80, with this sealing member being adapted for cooperation with an inner surface 81 of the body portion 34 which forms a valve seat for the valve member 76.

The valve member 76 is biased to be closed in a non-operating position, as by a compression spring 82 positioned in the bore 54 intermediate the wall 55 and the piston 66, and is further biased toward a closed position, as by the pressure acting upon the liquid upstream of the valve member 76 and being transmitted through the bore 73 in the rod 68 to a chamber 83 formed in the bore 54 intermediate the wall 55 and the piston 66. A second chamber 84 is formed between the piston 66 and the wall 52 with the piston 66 providing a movable wall for each of the chambers 83 and 84. The chamber 84 is vented to atmospheric pressure or to low ambient pressure as by vent passage 85. Accordingly, the relatively high pressure in the chamber 83 and the low pressure in the chamber 84 create a pressure differential across the piston 66 to urge the piston in a direction to move the valve member 76 toward a closed position and in contact with the valve seat 81. It is to be noted that the effective area of the valve member 76 is less than the effective area of the piston 66; therefore, the valve member will be retained in a closed position when liquid pressure exists in the conduit 12. The compression spring 82 acting alone functions to maintain the valve member 76 in a closed position during static, non-operating conditions and when no pressure exists in the conduit 12.

Figure 4:
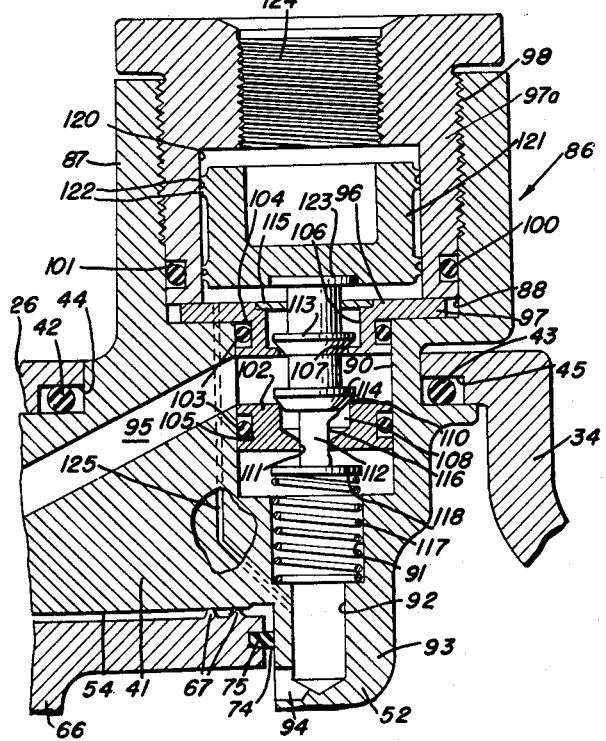
FIG. 4 is an enlarged fragmentary sectional view of the pilot valve portion of the control valve shown in FIG. 2.

In order to open the valve member 76, passage means are provided for connecting the chambers 83 and 84, with flow through this passage means being controlled, as by a pilot valve indicated generally at 86 in FIGS. 2 and 4. The pilot valve 86 is disposed in a radially extending boss 87 disposed outwardly from the central portion 41. The boss 87 is provided with a bore 88 and a reduced diameter coextensive bore 90. The bore 90 is further partially disposed in one of the webs 57 and has a reduced diameter portion 92 disposed inwardly therefrom and into an enlargement 93 formed in the wall 52. A laterally disposed passage 94 communicates between the inner end of the bore 92 and the chamber 84. An annularly disposed bore passageway 95 is formed through one of the webs 57 and communicates between the chamber 83 and the bore 90.

A valve disc 96, having a flanged portion 97, is disposed in the upper end of the bore 90 and extends outwardly into the bore 88. The disc 96 is retained in position as by a fitting 97a, which threadably engages in the outer end of the bore 88 as by threads 98. A sealing ring 100, disposed in a groove 101 about the inner periphery of the fitting 97a, provides a liquid seal between the fitting and the boss 87. A second valve disc 102 is positioned in the bore 90 in spaced relationship to the disc 96, with the disc 96 and 102 being spaced on each side of the passage 95. The discs 96 and 102 are sealed with respect to the bore 90, as by resilient annular sealing rings 103 positioned in annular grooves 104 and 105, respectively, in the discs 96 and 102. The disc 96 has a central aperture 106 which is reduced in diameter at one end to provide a valve seat 107. The disc 102 is likewise provided with a central bore 108, the upper edge 110 of which defines a second valve seat. The lowered end of the bore 108 is reduced in diameter, as at 111, for reception of a shaft 112 of a pilot valve member. The pilot valve member has spaced valve elements 113 and 114 which cooperate with the valve seats 107 and 110, respectively. The upper end of the stem 112 is slidably received in a guide member 115 disposed in the disc 96. The lower portion of the stem 112 has a longitudinal cutaway side portion 116 so as to provide clearance between the portion 112 and the reduced diameter bore 111. The valve member and valve elements 113 and 114 are urged in an open direction with respect to the valve seats 107 and 110, as by a compression spring 117 disposed in the bore 91, and acting against a flange 118 formed on the lower end of the valve member.

The fitting 97a is provided with an inwardly directed bore 120 in which a piston member 121 is reciprocally positioned. The piston member 121 has annular labyrinth seals 122. The lower side of the piston 121 is adapted for engagement with a flange 123 formed on the upper end of the pilot valve members. A threaded connection 124 is adapted for connection with the signal pressure sensing line 25, with the pressure thus sensed acting upon the piston 121 to maintain the pilot valve members 113 and 114 in closed positions and to occlude the passageway between the chambers 83 and 84 by way of the passage 95, bore 90, reduced diameter bore 111, bores 91 and 92, and passageway 94.

In order to maintain a balanced condition with respect to the pilot valve members 113 and 114, a pressure balance passage 125 is formed in the web 57 and communicates between the bore 92 and the upper face of the valve disc 96.

In operation, and assuming an at-rest condition with the pumps 14 and 16 still, liquid in the source tank 11 and the tank 10 having a level below the desired level, in this condition the valve member 76 will be in a closed position by action of the compression spring 82 and the pilot valve 86 will be opened by action of the spring 117. When the pumps 14 and 16 are started, flow will be established by way of the conduits 12 and 17 with the signal pressure sensed from the discharge side of the pump 16 being delivered through the sensing line 25 to the piston 121. This action will close the pilot valve 86 and prevent communication between the chambers 83 and 84, thus insuring positive closure of the valve member 76. When the tank 10 becomes full, the float level valve 15 will close, thus terminating flow through the conduits 12 and 13. The pump 14 will continue to operate, thus maintaining pressure on the liquid in the conduits 12 and 13.

In the event the pump 16 should fail, the tank 10 be ruptured, or for any other reason the pressure at the discharge side of the pump 16 should drop, the force acting upon the piston 121 will drop and when this force is overcome by the force of the spring 117, the pilot valve 86 will be opened with the valve members 113 and 114 leaving their respective seats 107 and 110, thus establishing communication between the chambers 83 and 84. Inasmuch as the chamber 84 is bled to atmosphere, as by the passage 85, the effective pressure in the chamber 83 will be lowered and the force of the liquid acting upon the valve member 76 will move the valve member toward an open position, thus permitting flow from the conduit 12 through the annular passageway 58 and into the conduits 23 and 20 to the pump 21 and conduit 22 to a point of use. In this case, the check valve 18 will prevent reverse flow which might establish a false signal pressure in the sensing line 25.

In FIGS. 5 and 6, another embodiment of a control valve, similar to valve 24, is illustrated. Here, the control valve, generally designated as 130, is a normally open valve in its non-operating position. The valve body is comprised of three annular members 131, 132 and 133 secured together in a sealed axial relationship by means of bolts 134. Similar to valve 24, valve 130 is adapted to have end 137 secured to conduit 12, end 138 secured to conduit 23, and the sensing fitting 139 secured to conduit 25.

Adjacent end 137, valve member 140 is shown to be seated in its normal closed operating position. Extending inwardly into the valve body is valve stem 141, secured at its outer end to the valve member by means of a nut 144. The stem 141 is slidably engaged in a boss 145 which is formed on an inner, generally annular chamber structure 146, substantially concentric with the exterior of the valve. The chamber structure 146 is spaced radially inwardly from valve body members 131, 132 and 133, and is secured to valve body member 132 by annularly spaced webs 147. On the inner end of the stem 141 is a piston 148, forming a dividing wall between two chambers 151 and 152. The piston 148 is sealingly and slidably engaged between the normally high pressure chamber 151 and the low pressure chamber 152 and is biased by spring 153 extending between the piston and boss 145, surrounding stem 141, to hold valve member 140 in its normal open position.

Stem 141 is open ended and provides a passage 154 from the upstream side of the valve member 140 in the conduit 12, for example. The piston 148 and the stem 141 are slidably engaged on a pin member 155 in chamber 151, the pin extending into passage 154 and having a longitudial groove 158 in the surface thereof so as to connect passage 154 and the upstream side of valve member 140 with chamber 151.

In axial alignment with chamber structure 146 is internal annular member 159, spaced radially inwardly from annular body members 132 and 133. The member 159 is held in place by annularly spaced webs 160 and 161 secured to body member 133. The inner end 162 of member 159 is sealingly engaged in chamber forming structure 146 so as to close the end of chamber 151 opposite that end formed by piston 148. Thus, the valve flow passage 165, to permit flow through valve 130 when the valve member 140 is open, is of generally annular configuration, formed inwardly of the valve body members and outwardly of the inner members 146 and 159.

The guide pin 155 extends from a pilot valve seat forming block 167 sealingly secured in an open end of a pilot valve chamber 168 in member 159, the block 167 having flow passages 169, 170 and 171 for providing communication between chamber 151 and pilot valve chamber 168. At the end of passage 171 in chamber 168 is pilot valve seat 174. The pilot valve 177 is shown in its closed position on seat 174, having its stem 178 extending through and threadably engaged with a pilot valve actuating piston 179. The pilot valve piston 179 forms a wall between the pilot valve chamber 168 and a sensing chamber 180 formed in inner annular member 159, axially outwardly of chamber 168.

In the pilot valve chamber is spring 181 extending between the pilot valve piston 179 and a wall of block 167 so as to bias the pilot valve piston in a direction to hold the pilot valve in a normally non-operating open position. In order to purge the chambers 168 and 180 of air, provide a continual bleed, and approximately balance the pressures on both sides of pilot valve piston 179 in the chambers, a small diameter orifice 184 extends through pilot valve stem 178 and provides communication between the latter chambers.

Also fitted in the inner end 162 of the member 159 is a check valve 185, shown in its normal operating closed position on seat 186. It is held in this position by spring 187 and by the normal operating pressure in chamber 151. The spring 187 is held in place by a fitting 188 threadably engaged in the member 159 and having an orifice 191 therethrough. The fitting 188 has circumferentially spaced re-entrant portions 194 in its inner end to permit flow around the check valve 185 when it is open, at which time chamber 151 is in communication with passage 193 and a sensing passage 192 in web 160 and adapted to be connected through the sensing fitting 139 to the sensing line 25, as shown in FIG. 1.

Referring to FIG. 6, which is a cross sectional view annularly spaced from the view shown in FIG. 5, there is shown a fitting 196 adapted to be connected to an atmospheric pressure or low ambient pressure line, such as line 85 shown in FIG. 1, and to it are connected ducts 197 and 198. The duct 197 connects the low pressure chamber 152 to the atmosphere or other low ambient pressure and the duct 198 connects the pilot valve chamber 168 to the same. It should be noted that the pilot valve piston 179 is limited in its movement toward the right by the seating of the pilot valve so that it never moves as far to the right in FIG. 6 as the passage 198.

In operation, when valve 130 is used in the system shown in FIG. 1, before the pumping commences or before pressure is applied to the system, the valve member 140 is in its normally open, non-operating position and the pilot valve 177 is in its normally open position. At this time, all of the chambers are vented to the atmosphere or to a low ambient pressure by the means disclosed above. When fluid pressure is developed in the line 25, this pressure is exerted against the pilot valve piston to close the pilot valve and thereby close the high pressure chamber 151 to the atmosphere or vent line 198.

If at this time the pressure in chamber 151, as it is likely to be, is less than the pressure in the line 25, the check valve 185 will be opened and the pressure will be increased in chamber 151 so as to positively move piston 148 to the right in FIG. 5 and cause valve member 140 to close. The check valve 185 also provides a positive means of maintaining valve member 140 closed when the system is operating and when the pressure in chamber 151 becomes less than the pressure in line 25 in that the check valve will be opened and the pressure in chamber 151 will be raised to operate against the piston and spring 153 to hold valve member 140 in its closed position.

The orifice 184 in the pilot valve stem allows the flow of fluid from the line 25 into the pilot valve chamber 168, which is constantly vented by means of the duct 198 so as to purge the air from and to approximately balance the pilot valve piston chambers. Thus, if the fluid is a liquid fuel, a line such as 85 in FIG. 1 would be connected to fitting 196 and to the top of a fuel tank having a relatively low pressure therein.

Since pressure in chamber 151 is normally maintained therein from the fluid upstream in conduit 12 through passage 154 and groove 158, when pressure fails in line 25 as a result of a failure of pump 16, for example, the pressure will be relieved in the sensing chamber 180 and on the face of the pilot valve piston 179 therein so that spring 181 will move the piston and open the pilot valve. The opening of the pilot valve permits the flow of fluid from the high pressure chamber 151 to the atmosphere or to a relatively low pressure tank, for example, thereby reducing the pressure in the latter chamber so that the spring 153 will move piston 148 to the left in FIG. 5 and cause valve member 140 to open, permitting the flow of fluid from conduit 12 through the main flow passage 165 in valve 130. The valve member 140 will remain open as long as the pressure in the chamber 180 is insufficient to overcome the biasing of the pilot valve spring 181.

Having thus described the present invention, it is emphasized that non-disclosed embodiments thereof may be made without departing from the inventive principles described herein.

We claim:

1. In a liquid flow control valve, the combination of: an annular valve body adapted for disposition intermediate adjacent ends of liquid conduits; attachment means for connecting said body with said conduits; an axially disposed portion in said body; an annular liquid flow passage providing communication between said adjacent ends of said conduits; a pressure responsive valve member positioned in said passage, said valve member being axially, reciprocally positioned in said portion; a piston connected with said valve member; a pair of chambers formed in said portion, said piston being disposed between said chambers and being exposed on one of its sides to pressure upstream from said valve member; a control passage and passages connected thereto interconnecting said chambers, said control passage and the chamber on the other side of the piston being constantly connected to the atmosphere; a normally open pilot valve disposed in said control passage; piston means responsive to a fluid signal pressure for operating said pilot valve; signal pressure means connected to supply said fluid pressure signal to said piston means; and means connecting said signal passage means and said chamber connected to said pressure upstream from said valve member to supply signal fluid pressure to said last chamber when the latter pressure is greater than the pressure upstream.

2. In a flow control valve: a valve body adapted for disposition intermediate adjacent ends of fluid conduits; attachment means for connecting said body with said conduits; an axially disposed, internally supported portion in said body; a fluid flow passage defined between said portion and peripheral portions of said body, said passage providing communication between adjacent ends of said conduits; a pressure responsive, normally open valve member positioned in said passage, said valve member being axially, reciprocally positioned in said portion; a piston connected with said valve member; a pair of chambers formed in said portion, said piston being disposed between said chambers and being connected on one side to pressure upstream from said valve member and on another side constantly connected to atmospheric pressure by way of a conduit from one of said chambers; a compression spring in said chamber connected to the atmosphere, said spring urging said valve member toward its open position; a control passage interconnecting said chambers; a normally open pilot valve disposed in said control passage; piston means responsive to a signal fluid pressure for operating said pilot valve; signal passage means connected to said piston means to supply said fluid signal pressure thereto; means connecting said signal passage means and said chamber connected to said pressure upstream from said valve member to supply said signal fluid pressure to said last chamber when said signal fluid pressure is greater than said pressure upstream from said valve; and bleed orifice means connecting both sides of said piston means to the atmosphere.

References Cited in the file of this patent

UNITED STATES PATENTS

| | | |
|---|---|---|
| 1,339,114 | Larner | May 4, 1920 |
| 1,477,850 | Pool | Dec. 18, 1923 |
| 1,824,916 | Moody | Sept. 29, 1931 |
| 1,947,616 | Riney et al. | Feb. 20, 1934 |
| 1,987,819 | Foulds | Jan. 15, 1935 |
| 2,018,555 | Heaney | Oct. 22, 1935 |
| 2,038,601 | Quick | Apr. 28, 1936 |
| 2,124,619 | Kerr | July 26, 1938 |
| 2,519,968 | Jordon | Aug. 22, 1950 |
| 2,805,038 | Towler | Sept. 3, 1957 |

FOREIGN PATENTS

| | | |
|---|---|---|
| 1,181,380 | France | Jan. 5, 1959 |